R. COATES.
LUBRICATOR.
APPLICATION FILED MAY 21, 1912.

1,069,677.

Patented Aug. 12, 1913.

WITNESSES
Harry C. Heebig
Wm. C. Dunn

INVENTOR
Robert Coates
BY
Howard J. Sherman
ATTORNEY

UNITED STATES PATENT OFFICE.

ROBERT COATES, OF NEW YORK, N. Y., ASSIGNOR TO CHARLES M. SCHUNCK AND PETER R. OGG, DOING BUSINESS UNDER THE FIRM-NAME OF SCHUNCK & OGG, OF NEW YORK, N. Y.

LUBRICATOR.

1,069,677.     Specification of Letters Patent.     Patented Aug. 12, 1913.

Application filed May 21, 1912. Serial No. 698,751.

*To all whom it may concern:*

Be it known that I, ROBERT COATES, a subject of Great Britain, residing in the city of New York, borough of Manhattan, county and State of New York, have invented certain new and useful Improvements in Lubricators, of which the following is a full, clear, and exact specification.

My invention relates to a means for the constant lubrication of rapidly moving mechanisms with its special application to vibratory massage appliances.

During the rapid revolution of shafts, especially when fitted with enlarged members, the produced centrifugal force has a tendency to throw the lubricant outwardly away from the bearings, thus allowing them to be subjected to undesirable wear producing loose bearings with a consequent diminution of power and an unbalancing of the mechanism. My invention overcomes these objections, reduces the wear at the bearing point to a minimum and instead of allowing the lubricant to be thrown away from the friction point, causes it to be banked up or accumulated at the bearing, thus producing a perfect lubrication at the place of wear.

This new and novel invention is particularly adaptable and advantageous when used in conjunction with vibratory massage mechanisms, where the wear at the point of friction is abnormally great on account of the unbalanced members necessary to produce the vibrating motions. The vibrating members of a massage mechanism of this description must revolve very rapidly, sometimes running as high as 6000 revolutions per minute, and the throw or thrust of the unbalanced member at this speed wears away the bearings very rapidly, unless thoroughly lubricated, causing the revolving member to run out of plumb, weakening the shaft at the bearing and allowing the rapidly revolving member to strike the surrounding casing.

None of the present known vibratory massage mechanisms allows of the necessary perfect lubrication and hence are subject to the above dangerous disadvantages. It should be further noted that in using massage apparatus of this class, the use of thin liquid lubricants is prohibitive on account of their tendency to run back along the flexible revolving shaft, rotting and destroying its flexible covering.

Figure 1:
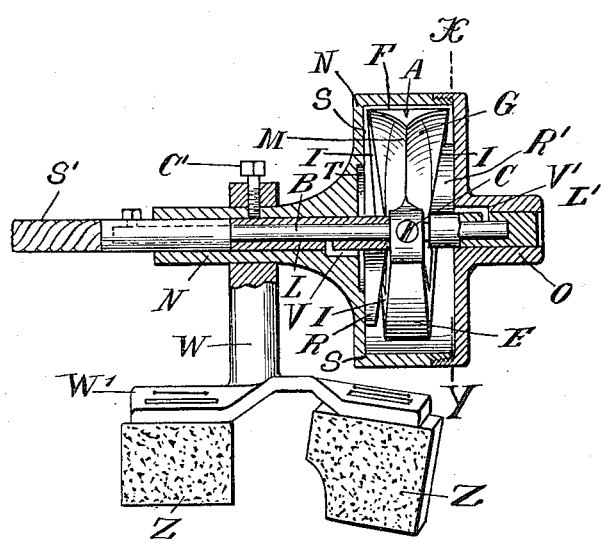
Figure 2:
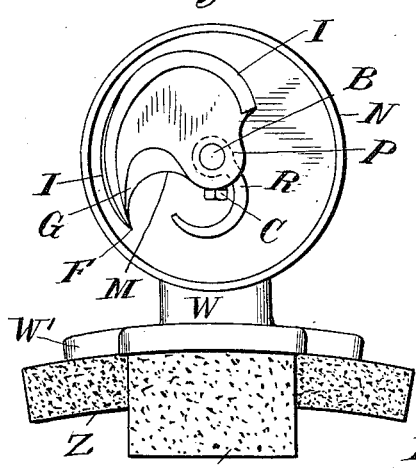
Figure 3:
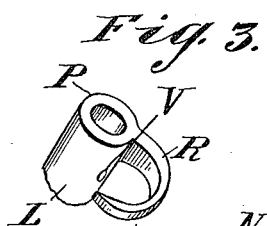
Figures 4, 5:
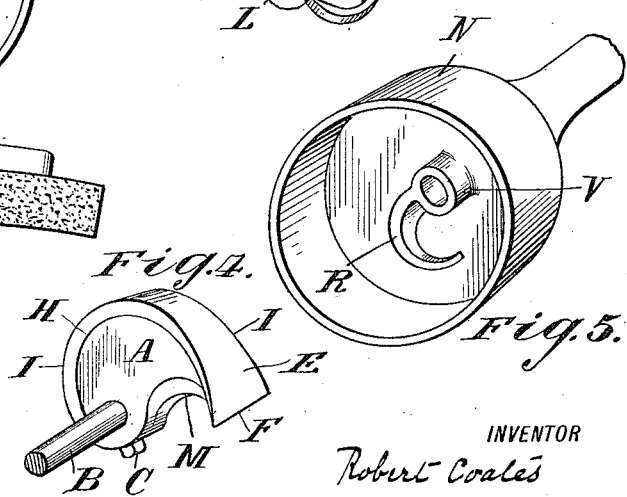

Figure 1, of the accompanying drawings illustrates a cross section of one form of my invention. Fig. 2, illustrates a section through the line X Y of Fig. 1. Fig. 3, is a perspective view of the spiral banking member L. Fig. 4, is a perspective view of the rotary member A. Fig. 5, is a perspective view of a form of combined casing and spiral banking member.

In the form of my invention illustrated in the accompanying drawings, the rotary member A is fixedly attached to the shaft B by means of the set-screw C. The rotary member A is of irregular shape, the outer edge I forming the outline of a segment of an approximate ellipse. The outward surface E broadens gradually and regularly from the point nearest the set-screw C to its extremity at F until it nearly approaches the top and sides of the casing N. Upon each side of the rotary member A, is a recess perpendicular to the shaft B extending outwardly toward the surface E, the depth and extension of said recess being such as to properly accommodate the banking member L as explained later. The extremity of the outward surface F is so formed as to present a comparatively sharp or scooping surface, which can be produced by beveling the edges I and the outward end of the edge M. The shaft B is so situated as to produce an unbalanced rotary member A. The shaft B extends through the casing bearing N and the rotary member A into the casing bearing O. The rotary member A is inclosed in the casing N consisting of the removable head O and the main shaft bearing portion. Within the shaft bearing portion of the casing is the spiral banking member L, consisting of a hollow part P suitable for carrying the shaft B and a fixedly attached spiral member R. The spiral member R is so formed as to lie flush, or nearly flush, with the surface S of the casing, and to play within and nearly touch the adjacent surface of the recess of the rotary member A during the rotation of the latter. The concave surfaces of the banking member R and of the rotary member A lie in opposite directions as shown in Fig. 2 so that when the latter is revolved, the lubricant will be collected by its scooping action and brought around and banked up in the concave portion of the banking member. A recess T is formed in the casing N around the bearing in order to allow an accumulation of lubricant at the wearing point. An oiling means or channel V for the lubricant is formed from the inner face of the casing N, through the casing and into the shaft bearing. A similar banking member R' and lubricating channel V' are arranged upon and in the removable casing head O in the same relative position to the rotary member A as those in the shaft bearing casing. The shaft B is connected by any well known means to a flexible shaft S' connected with a motor or other source of power. The casing N and the hollow sleeve P of the banking member L are fixedly attached to each other by means of the set-screw O'. The casing N has an integral part W enlarged at its other extremity into the plate W' to which are attached pieces of rubber or other resilient material Z.

In operation the proper lubricant is introduced within the casing N through the removable end O. When the rotary member A revolves, it collects or scoops up the lubricant and conveys it to and banks it up in the concavity of the spiral banking members R and R' from which it is fed to the bearing through the end of said bearing and through the channels V and V', and hence any lubricant thrown to the outward periphery of the casing is immediately brought back by the rotary member and applied to the bearing point by means of the banking member. The vibrations caused by the rapid revolutions of the unbalanced rotary member are conveyed by means of the casing standards W and W' to the resilient materials Z, and when these are attached to the back of the hand of the operator, the motion is transmitted to the person to whom the operator's hand is applied. The casing standard W may be an integral part of or attached to any point of the casing, where it will transmit the vibratory motion. It is evident that the spiral R instead of being attached to the hollow casing P, may be an integral part of the casing N as illustrated in Fig. 5. While only one banking member is shown upon each inner face of the casing N, several may be used if better results are thus produced in any particular mechanism.

I do not limit myself to the particular described shapes, sizes or arrangements of the rotary member, banking member, lubricating channels or other parts of the mechanism, all of which may evidently be varied without going beyond the scope of my invention, which is a means whereby, in a rapidly revolving mechanism the lubricant may be brought back to or accumulated at the bearing point of the sustaining shaft.

Having thus described my invention, what I claim is:

1. In a device of the character specified, the combination of a revoluble shaft, a rotary member with spiral like projections for collecting and carrying a lubricant fixedly attached thereto, and a spiral-shaped banking member arranged to deposit the lubricant at the bearings.

2. In a device of the character specified, the combination of a revoluble shaft, a rotary member with spiral like projections for collecting and carrying a lubricant fixedly attached thereto, a spiral-shaped banking member arranged to deposit the lubricant at the bearings and a surrounding and inclosing casing.

3. In a massage apparatus, a revoluble shaft, an unbalanced member with spiral-like projections for collecting and carrying a lubricant fixedly attached thereto, a spiral-shaped banking member as a depository for the lubricant and a surrounding and inclosing casing.

4. In a massage apparatus, a revoluble shaft, an unbalanced rotary member with spiral-like projections for collecting and carrying a lubricant fixedly attached thereto, a casing carrying bearings in which the shaft is revoluble, and spiral-shaped banking members arranged to deposit the lubricant at the bearings.

5. In a massage apparatus, a revoluble shaft, an unbalanced rotary member with spiral-like projections for collecting and carrying a lubricant fixedly attached thereto, a casing carrying bearings in which the shaft is revoluble, spiral-shaped banking members arranged to deposit the lubricant at the bearings and a lubricating means for carrying a lubricant from the interior of the casing to within the bearings.

In witness whereof I have hereunto set my hand in the presence of two subscribing witnesses.

ROBERT COATES.

Witnesses:
CHAS. LYON RUSSELL,
HARRY C. HEBIG.

Copies of this patent may be obtained for five cents each, by addressing the "Commissioner of Patents, Washington, D. C."